United States Patent
Bronikowski et al.

(10) Patent No.: US 6,947,798 B2
(45) Date of Patent: Sep. 20, 2005

(54) SYSTEM AND METHOD FOR DEVELOPING SOFTWARE PROGRAMS BY WAY OF MULTIPLE APPLICATIONS AND USERS

(75) Inventors: Joseph T. Bronikowski, New Berlin, WI (US); Kam-Por Yuen, Anthem, AZ (US); Paul T. Robak, Milwaukee, WI (US)

(73) Assignee: Rockwell Software Inc., Milwaukee, WI (US)

( * ) Notice: Subject to any disclaimer, the term of this patent is extended or adjusted under 35 U.S.C. 154(b) by 194 days.

(21) Appl. No.: 10/273,685

(22) Filed: Oct. 18, 2002

(65) Prior Publication Data

US 2003/0045950 A1 Mar. 6, 2003

Related U.S. Application Data

(63) Continuation-in-part of application No. 09/404,771, filed on Sep. 24, 1999, now Pat. No. 6,477,435.

(51) Int. Cl.$^7$ .............................................. G06F 19/00
(52) U.S. Cl. ......................... 700/90; 700/83; 700/182; 707/10; 710/62
(58) Field of Search .............................. 700/17, 18, 83, 700/82, 87, 96, 97, 186, 182, 180; 707/10; 709/217; 710/62; 345/84

(56) References Cited

U.S. PATENT DOCUMENTS

| 5,812,394 A | 9/1998 | Lewis et al. |
| 5,822,206 A | 10/1998 | Sebastian et al. |
| 5,950,006 A * | 9/1999 | Crater et al. ................ 717/140 |
| 6,154,684 A * | 11/2000 | Schwenke et al. .......... 700/159 |
| 6,161,051 A | 12/2000 | Hafemann et al. |
| 6,449,624 B1 | 9/2002 | Hammack et al. |

FOREIGN PATENT DOCUMENTS

EP    03 02 3027    1/2004

OTHER PUBLICATIONS

Gerstner, T. et al.; "Rationelles Projektieren Von Automatisierungssystemen" (Rational Planning of Automation Systems), Automatisierungstechnische Praxis—ATP, Oldenbourg Verlag. Muchen, DE, vol. 36, No. 12, Dec. 1, 1994, pp. 42–45, XP000483710.

(Continued)

*Primary Examiner*—Kidest Bahta
(74) *Attorney, Agent, or Firm*—Quarles & Brady LLP; William R. Walburn

(57) ABSTRACT

A system and method are disclosed for developing programs for operating industrial processes. The system includes an operator interface, and a computer coupled to the operator interface, where the computer includes a memory and a processor. The memory stores a first program and information concerning a plurality of templates within at least one library and a plurality of objects within at least one project that is representative of the at least one industrial process. The processor is configured to execute the first program to process information stored within the memory so that the processed, stored information can be operated upon by a second program. The first program is capable of performing at least one of (1) determining an identity of one of the second program and a third program that was employed to generate the information, and (2) selecting portions of the stored information for use by the second program.

26 Claims, 8 Drawing Sheets

OTHER PUBLICATIONS

Pattle, R. et al.; "OPC the de facto standard for real time communication", Parallel and Distributed Real–Time Systems, 1997. Proc. of the Joint Wkshp. on Geneva, Switz., Apr. 1–3, 1997, Los Alamitos, CA, USA, Apr. 1, 1997, pp. 289–294, XP010258221.

2004 Microsoft Corporation; Visual Studio Home: "Visual SourceSafe Product Information", obtained at http://msdn.microsoft.com/vstudio/previous/ssafe/productinfo/Default.aspx?print–true, printed Aug. 3, 2004, 7 pages.

2004 Microsoft Corporation, "Technical Information for Visual SourceSafe 6.0", obtained at http://msdn.microsoft.com/vstudio/previous/ssafe/using/Default.aspx?print–true, printed Aug. 3, 2004, 9 pages.

2004 Microsoft Corporation, "Visual SourceSafe 6.0", obtained at http//msdn.microsoft.com/library/en–us/dnanchor/html/VSS6Anchor.asp?frame–true, printed Aug. 3, 2004, p. 1.

* cited by examiner

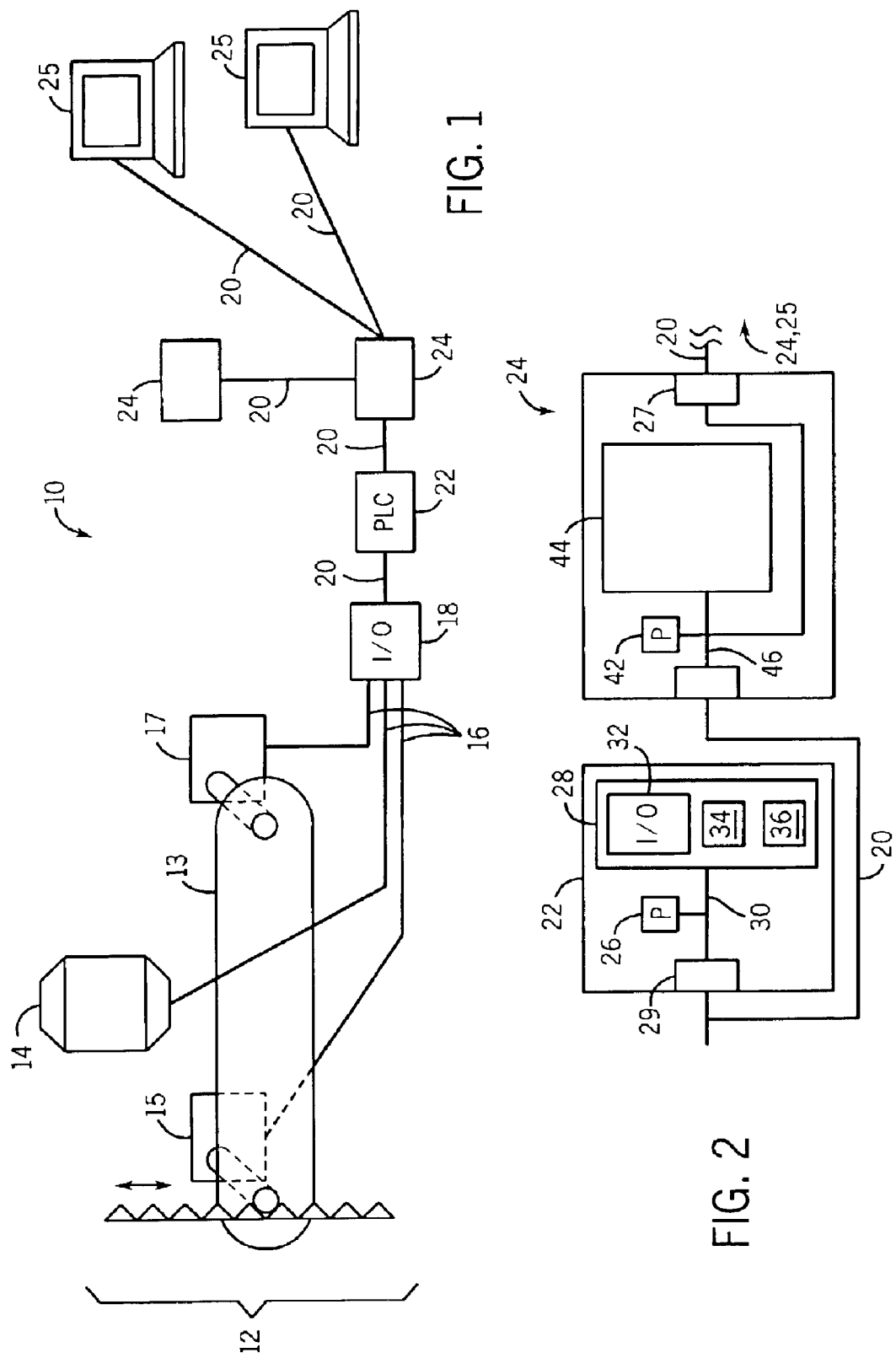

SYSTEM AND METHOD FOR DEVELOPING SOFTWARE PROGRAMS BY WAY OF MULTIPLE APPLICATIONS AND USERS

CROSS-REFERENCE TO RELATED APPLICATIONS

This application is a continuation-in-part of and claims the benefit of U.S. patent application Ser. No. 09/404,771, which was filed on Sep. 24, 1999 now U.S. Pat. No. 6,477,435.

FIELD OF THE INVENTION

The present invention relates to systems that employ networks of computers and/or operator interfaces, and more particularly relates to such systems that are employed to develop software programs for use in a variety of a environments including, for example, programs for controlling industrial processes or manufacturing equipment.

BACKGROUND OF THE INVENTION

Computer programs are implemented in countless ways in modem life to provide control, monitoring and other capabilities to a variety of systems. Although some standardized programs are used ubiquitously, many (if not most) modem systems require at least some programming that is uniquely tailored for the particular purposes of the systems. For example, personal computers are increasingly commonly being employed to operate complicated control or monitoring programs within the home, where a given program is specifically intended for use with respect to a particular house. Also for example, industrial controllers, which are commonly used for controlling industrial processes or manufacturing equipment, typically require control programs that are uniquely designed for the particular industrial process. Such programs not only may allow for the control of various processes, but also may provide human machine interfaces (HMIs), which often depict a graphic representation or all or part of the process animated to show its current operating state.

Accordingly, it is important to be able to efficiently and easily develop unique or custom-tailored software programs for a variety of systems in a variety of environments. In U.S. patent application Ser. No. 09/404,771, which was filed on Sep. 24, 1999, and which is hereby incorporated by reference herein, a system is described that allows templates to be associated with portions of a model of an industrial process, typically in response to commands received from a program designer as provided by way of a computer terminal. Once the templates are associated with portions of the area-model, the templates are instantiated into objects that pertain to the particular portions/components. During the instantiation process, the system automatically renames those of the variables of the instantiated objects that must be renamed in order to allow the objects to operate in concert with one another as an overall control program.

Though effective, the above-described system is designed for use with templates and objects that use (or have been created using) specific types of data formats associated with particular software applications, particularly batch-centric applications (e.g., following the S88 format). That is, program designers are limited to using particular types of applications to create templates, to create projects (or area-models associated with the projects), and instantiating templates to create objects. Consequently, a variety of commonly-used third-party software programs (e.g., MS Word) cannot be readily used by program designers to create templates, projects, and objects. Additionally, while it is sometimes the case that a single program designer will design a given program, it is also commonly the case that multiple program designers will need to collaborate in the designing of a control program. For example, programs now can be developed through the use of programs, files and other resources that exist at a variety of locations, and be developed through the efforts of multiple computer programmers or other users, who may be interconnected with one another by way of a network such as the internet or World Wide Web. Further, regardless of whether a particular control program is designed by a single individual using resources located at a single location, the templates, objects and other tools that are stored by a given system for developing programs may be of interest to a number of program designers with respect a variety of different control programs that are under development. Additionally despite the frequent need for tailoring of programs, a given customized control program may nevertheless be applicable to the operation of more than a single controller in a single circumstance.

While it may be desirable that a given program or tools used in designing programs be accessible to multiple parties or controllers, allowing multiple points of access to such information can be problematic. In particular, if multiple parties are able to access, modify, and store control program information, there is the possibility that one of the parties will make a change to the information that is not desired by others of the parties. Indeed, some parties may not be aware that such changes have been made. Indeed, there is even the risk that unauthorized parties will modify the stored information in a manner that is undesirable. Also, there is the possibility that a finished control program that is to be implemented on a controller will be changed by a party who is not aware of the fact that the control program is a finished form.

Therefore, it would be advantageous if existing systems and methods for developing software programs could be improved in several ways. In particular, it would be advantageous if existing systems were capable of handling and utilizing data in a variety of formats associated with many commonly-used third party software programs, rather than simply specialized data formats. It would further be advantageous if such systems could import, export, call up, and extract data in a variety of such formats, and if such systems were able to communicate with a variety of third party applications with respect to such data. It would additionally be advantageous if such systems were able to communicate with multiple program designers, to allow those program designers to gain access to and modify information stored on the systems, without significant risk that information stored on the systems would be changed in an unexpected or problematic manner.

BRIEF SUMMARY OF THE INVENTION

The present invention provides a system and method for developing programs that includes one or more interface or wrapper programs that allow templates and other information residing at a central computer to be accessed and modified by operator interfaces, even though the templates and other information have different information formats. The wrapper programs in particular are able to identify the type of application program that was used to create data stored in the system, and interpret the data so that an operator interface can use and/or modify the data. The wrapper programs also are able to extract, from data stored in the system, information relating to particular fields or variables.

Additionally, the present invention stores information by way of a repository. The repository operates so that, at any given time, templates, objects, projects, or other control program information is accessible for modification purposes by only a single user at one operator interface (e.g., the information is "checked out" by that user), such that other users are not able to simultaneously modify that information (although multiple users can simultaneously access the same information for reading purposes). Further, to the extent that modifications are made to certain information, the modifications are recorded as being updated versions, so that a record is kept of the modifications. Additionally, to the extent that a particular control program is in its final form and is sufficient for implementation on a controller, the system allows for a separate copy of the control program to be downloaded to the controller in addition to the copy retained on the system, such that later changes to the system copy do not necessarily affect performance of the controller.

In particular, the present invention relates to a system for developing a program for operating at least one industrial process. The system includes a first operator interface, and a computer coupled to the operator interface, where the computer includes a memory and a processor. The memory stores a first program and information concerning a plurality of templates within at least one library and a plurality of objects within at least one project that is representative of the at least one industrial process. The processor is configured to execute the first program to process information stored within the memory so that the processed, stored information can be operated upon by a second program. The first program is capable of performing at least one of (1) determining an identity of one of the second program and a third program that was employed to generate the information, and (2) selecting portions of the stored information for use by the second program.

Additionally, the present invention relates to a system for developing a program for operating at least one industrial process. The system includes a plurality of operator interfaces. The system further includes means for storing information, where the stored information includes templates in at least one library, and projects having a plurality of objects, where the projects correspond to the at least one industrial process. The system additionally includes means for governing access to the stored information so that each respective library and object is only accessible by way of a single operator interface at any given time. The system further includes means for processing the stored information when it is being accessed so that at least one of (1) the stored information is in a format that can be acted upon by an application program, and (2) modifiable portions of the stored information are identified.

Further, the present invention relates to a method of developing a program for operating at least one industrial process. The method includes receiving a first command from an operator interface to access a desired library of templates, and retrieving from a repository stored information regarding the desired library. The method additionally includes processing the stored information by way of a wrapper program in order to at least one of (1) obtain a desired subset of the stored information, (2) identify an application program that is capable of processing the stored information, and (3) reconfiguring at least a portion of the stored information so that it is capable of being processed by the application program. The method further includes displaying at least one portion of the processed, stored information at the operator interface, and receiving a second command from the operator interface to access a desired project. The method additionally includes retrieving from the repository store information regarding the desired project, and receiving a third command from the operator interface to instantiate one of the desired template and another template based upon the desired template onto an object within the desired project.

The present invention also relates to a method for developing and retaining a program for controlling an industrial process. The method includes providing a database for storing data files, providing a graphical user interface capable of displaying graphical objects, and displaying on the graphical user interface a plurality of the graphical objects in association with one another to represent the industrial process. The method additionally includes receiving a selection of one of the graphical objects, determining whether data stored in a repository and associated with the selected graphical object is currently checked out by another, and displaying the data associated with the selected graphical object when the data is determined to be not checked out by another.

The present invention further relates to a system for developing a program for operating at least one industrial process. The system includes a first operator interface, and a computer coupled to the operator interface, where the computer includes a memory and a processor. The first operator interface is capable of displaying a plurality of graphical objects in associated with one another, where the associated graphical objects are representative of components of the industrial process. The first operator interface is capable of receiving commands to display data associated with the respective graphical objects. In response to one of the commands being provided to the first operator interface with respect to one of the graphical objects, a wrapper is actuated within the computer to determine an application that can be employed to access the data associated with that graphical object, so that the data can then be displayed at the operator interface by way of the application.

BRIEF DESCRIPTION OF THE DRAWINGS

FIG. 1 is a simplified block diagram of a system for developing control programs for an industrial process, which includes server computers, operator interfaces, and a controller for controlling an industrial process based upon the control programs;

FIG. 2 is a detailed block diagram of the controller and one of the server computers of the system of FIG. 1;

DETAILED DESCRIPTION OF THE INVENTION

Figure 3:
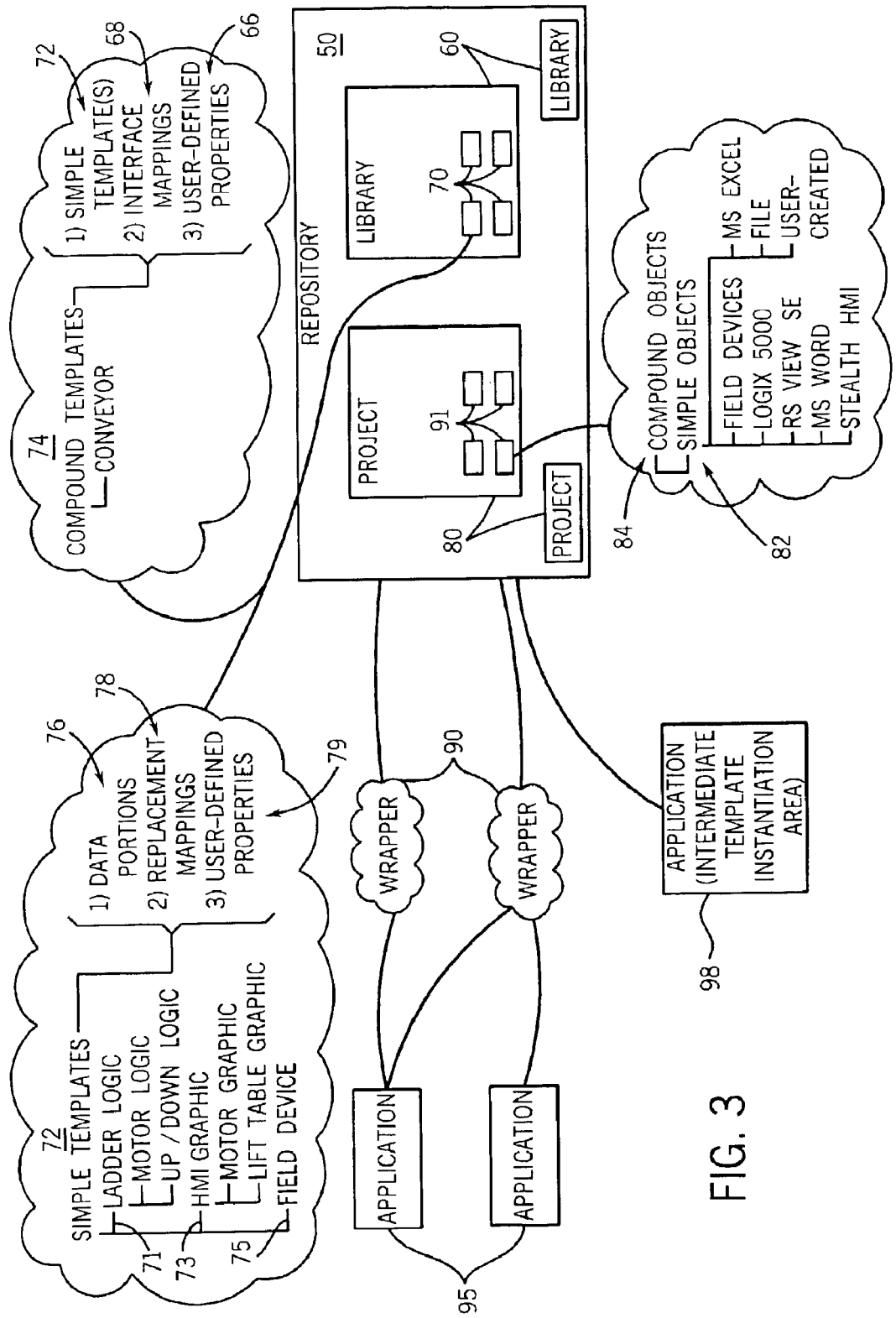
FIG. 3 is a schematic diagram showing software programs and entities employed by the system of FIG. 1.

Referring now to FIG. 1, an industrial control system 10 is used to control a process 12 which, for example, may include components such as a tank 14, as well as a conveyor 13 operated by first and second motors 15 and 17, which respectively control movement of a conveyor table up and down and control movement of the conveyor belt. The process 12 may be controlled according to control variables communicated over lines 16. The control variables may be output signals controlling actuators (e.g., the motors 15,17) or may be inputs from sensors (e.g., on the tank 14) such as temperature sensors, motion sensors or level sensors.

The lines 16 are received by I/O circuits 18 providing for basic signal processing known in the art and for the conversion between analog signals and digital values for computer processing. The digital values may be communicated over a communication link 20 between the I/O circuits 18 and a programmable logic controller (or PLC) 22. The programmable logic controller 22 also communicates, either over the communication link 20 or separate communication link(s), with one or more server computers 24. The server computers 24 are further in communication, either by way of the communication link 20 or separate communication link(s), with one or more operator interfaces 25 such as conventional desktop computers or workstations. The server computers 24, operator interfaces 25, and programmable logic controller 22 (and possibly other programmable logic controllers associated with other industrial processes), can be configured in a network, such that the various devices are able to communicate with one another. For example, where as shown two server computers 24 are employed, either of the operator interfaces 25 potentially can communicate with both of the server computers 24.

Referring now to FIG. 2, the programmable logic controller 22 includes at least one processor 26 connected with an internal memory 28 via a bus 30 also communicating with the communication link 20 by way of an I/O module 29. The memory 28 includes an I/O table storing values of the control variables received from or transmitted to the I/O circuits 18. The memory 28 also includes a control program 34 reading those I/O values and executing a control logic prepared by a programmer specifically for the controlled process 12, and various operating system programs 36 well understood in the art.

The control program 34 is generated by way of one or more of the servers 24 operating in conjunction with one or more of the operator interfaces 25, which allow for programmers or other persons to input commands or other information relating to the control program. As shown in FIG. 2, each of the servers 24 includes a processor 42 (e.g., a microprocessor, microcontroller, computer or the like), a memory 44, and one or more I/O terminals 27, all of which are coupled by way of an internal bus 46. The I/O terminals 27 allow for communication between the servers 24 and the communication link(s) 20. As discussed further with reference to FIGS. 3–7, the memory 44, as controlled by the processor 42, acts as a repository that operates according to specific procedures that make it possible for the control program 34, and other information useful in creating the control program, to be input, accessed and modified in an organized manner by way of the multiple servers 24, operator interfaces 25, and programmable logic controller 22 (or possibly more than one such programmable logic controller), etc.

Turning to FIG. 3, aspects of the software programs that are operable on the industrial control system 10 are shown. As mentioned earlier, the memory 44 of the server computers 24 (as operated by the processor 42 of each respective computer) operates as a repository 50. Within the repository 50 are stored one or more libraries 60 of templates 70. The templates 70 constitute program fragments that have not yet been instantiated into program objects, that is, control variables and other portions of the templates have not been configured for operation in a specific control program. Also stored within the repository 50 are one or more projects 80. The projects 80 are control programs that are either completed or in a state of development, and that are intended for eventual implementation on one or more programmable logic controllers 22 associated with one or more processes such as the process 12. The projects 80 constitute maps or models of industrial processes, which can be displayed in a hierarchical list of schematic form. The projects 80, when completed, are made up of objects 91 that correspond to the different components within the projects, and which operate in conjunction with one another to form the overall control programs.

Figure 4:
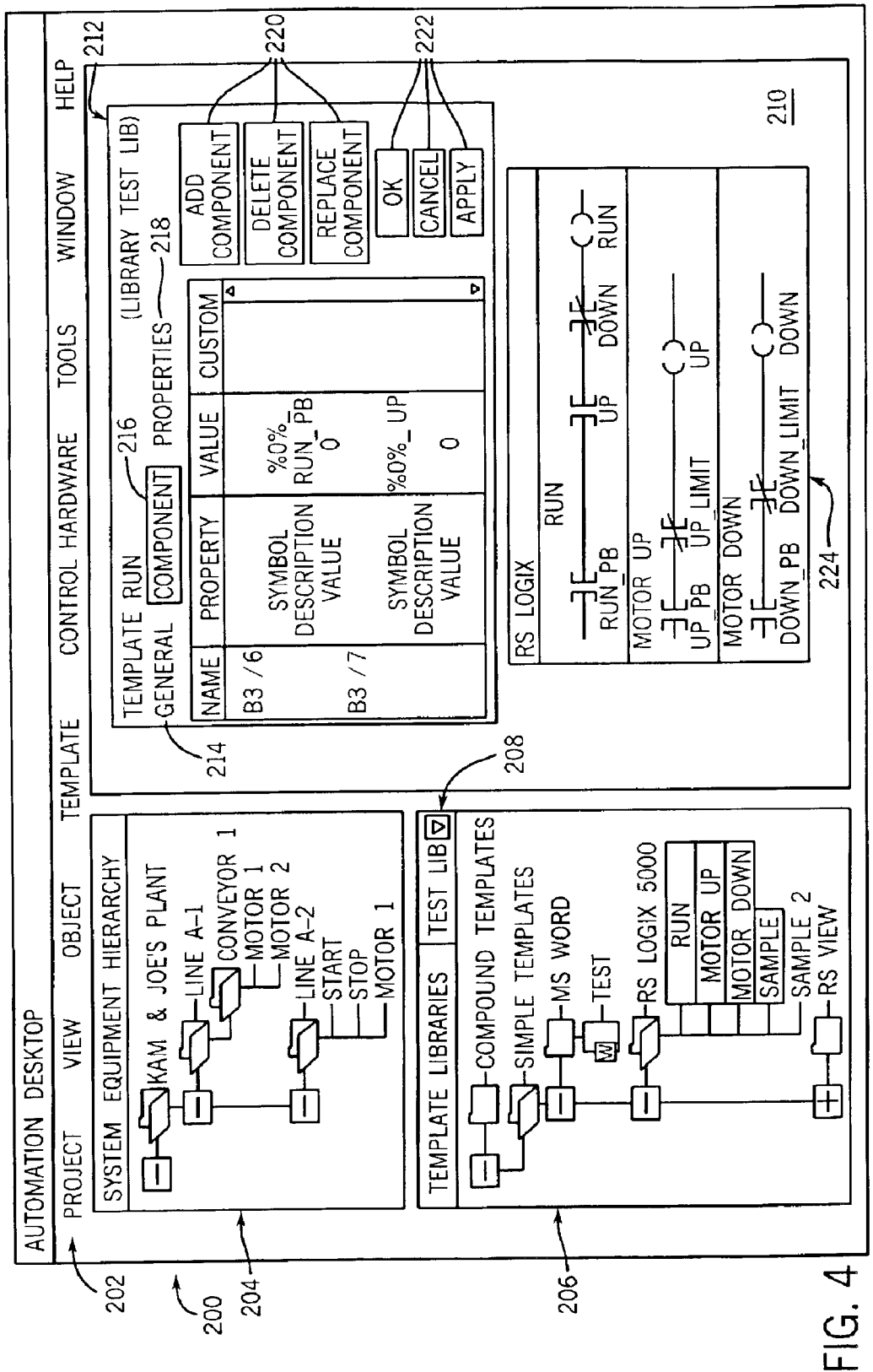
FIGS. 4–6 provide views of several exemplary screens that may be displayed by the operator interfaces of the system of FIG. 1, particularly during development of a control program.
Figure 5:
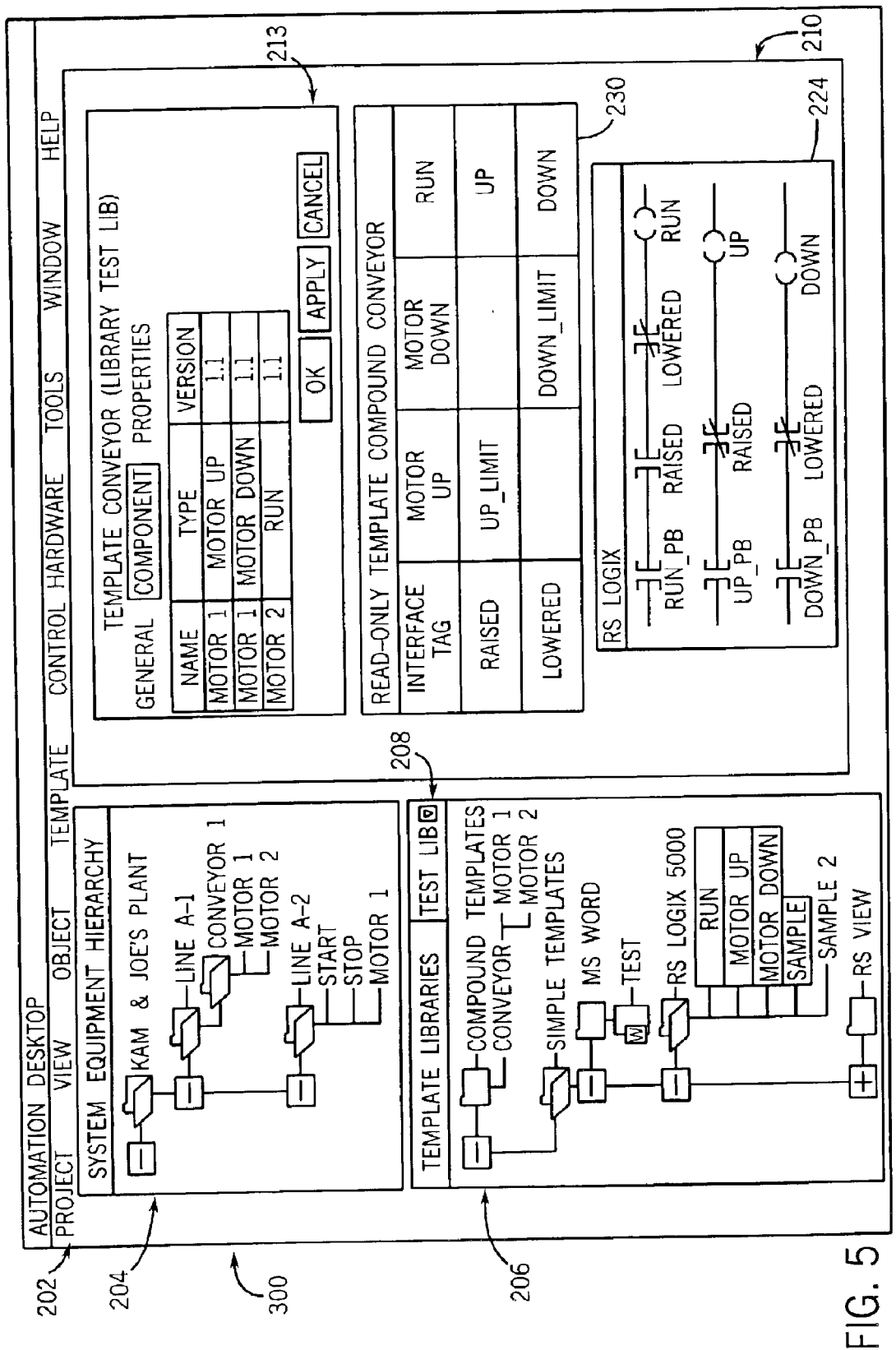
Figure 6:
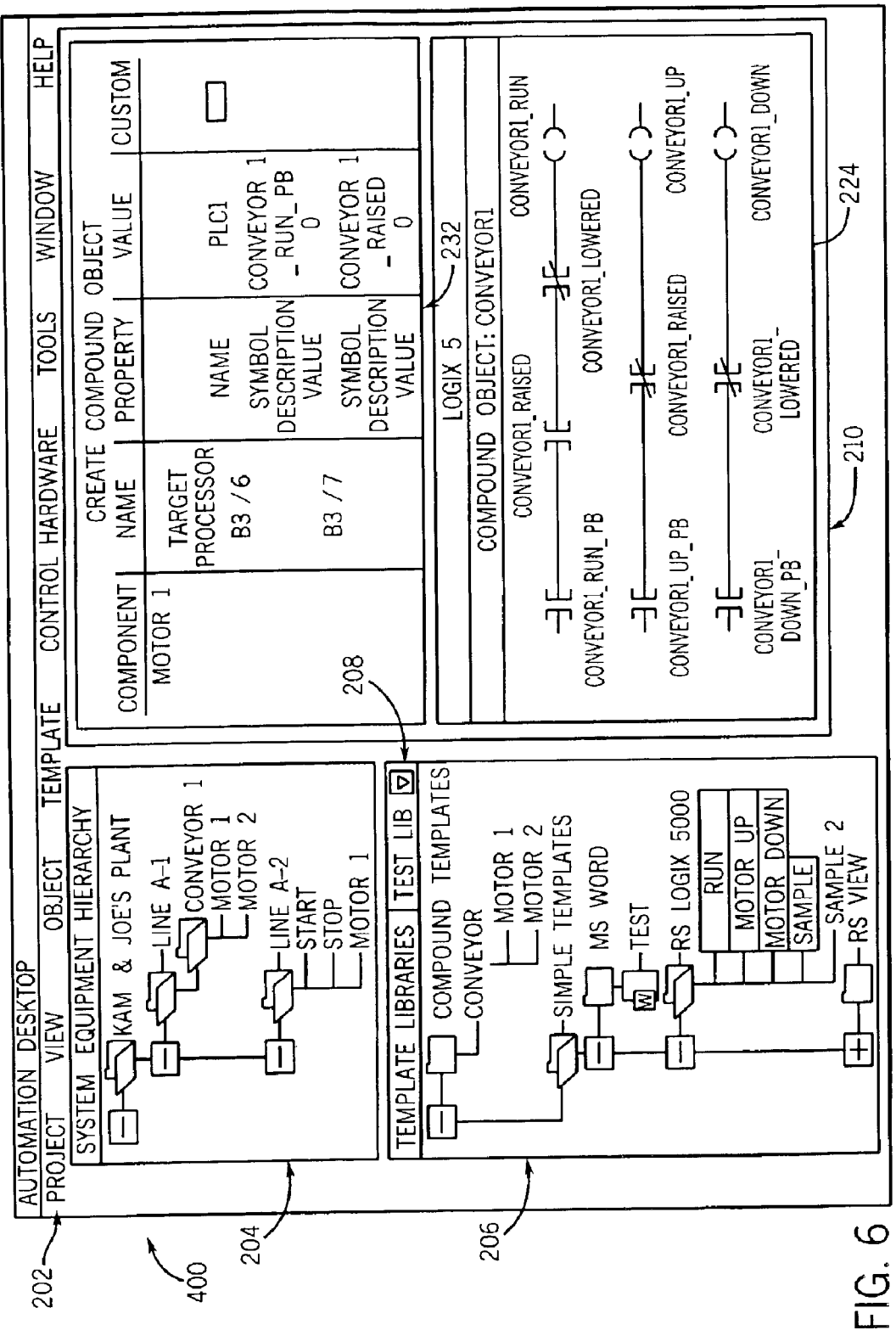

As shown, in the present embodiment, the templates 70 can include either or both of simple templates 72 and compound templates 74. Each simple template 72 typically includes three portions, namely, a main data portion 76, control variables that can be replaced and thereby constitute replacement mappings 78, and user defined properties 79. The main data portion 76 typically is the body or control logic code of a simple template 72. The main data portion 76 can include ladder code and graphic information that will be duplicated during instantiation. The replacement mappings 78, which are described further with reference to FIGS. 4–6, are particular input and output variables of the simple template 72. The user-defined properties 79 specify characteristics of the simple template and can be used to specify the replacement mappings as well. Exemplary simple templates 72 could include, as shown in FIG. 3, ladder logic templates 71, HMI graphic templates 73, and field device templates 75.

As discussed, the templates 70 further can include compound templates 74, each of which typically includes one or more simple templates 72, one or more interface mappings 68, and one or more user-defined properties 66. The interface mappings 68 constitute replacement variable names or tags that link the simple templates 72 of the compound template 74 together. The user-defined properties 66 can specify characteristics of the compound template 74 and also be used to specify replacement mappings.

Similarly, the objects 91 of the projects 80 can be either simple objects 82 or compound objects 84. The simple objects 82 can include data in a variety of formats. For example, as shown, the simple objects 82 can include (in one embodiment) field device objects, objects created using Logix 5000, RSView SE data, or MS Word, RSView SE HMI-created objects, objects created by way of MS Excel, other file-related objects and user-created objects (e.g., objects created by way of a simple editor). Further, the compound objects 84 are made up of one or more simple objects 82. As instantiated versions of the simple templates 72, the simple objects 82 are instantiated program portions that correspond to low-level components of the industrial process 12 or other process (e.g., individual motors). The compound objects 84, which are instantiated versions of the compound templates 74, constitute program portions that correspond to higher-level portions of the process 12 (or another process), e.g. portions of the process that include multiple lower-level components (e.g., a conveyor that depends for its operation upon two motors). The projects 80 can be formatted in accordance with the S95 standard, which classifies equipments into three categories, namely, discrete, batch and continuous equipments, although other standards can also be employed.

In accordance with one embodiment of the present invention, the memory 44 includes, in addition to the data within the repository 50, additional interface or "wrapper" programs 90 that interface between the data within the repository, such as the templates 70 and the objects 91, and application programs 95 that can be invoked at the operator interfaces 25. The wrapper programs 90 need not be employed to interface between the data within the repository 50 and certain applications, such as an applications 98, which for example may be specially designed to handle data within the repository or designed to perform a particular limited function. Nevertheless, the present system 10 is designed to enable the development of control programs by way of templates 70 and objects 91 that are formatted in accordance with a variety of software formats, including familiar third-party software programs such as MS Word and MS Excel. Thus, the wrapper programs 90 allow the system 10 to be highly flexible in terms of the types of data that can be incorporated into control programs and be accessed by users. The wrapper "programs" 90 referred to herein should be understood to encompass a broad variety of different program routine types, including not only full-fledged programs or applications, but also template modules, interface modules, plug-in modules, or dynamic link libraries ("dlls") that contain multiple executable program routines called upon by other applications.

The wrapper programs 90 provide several functions. In particular, the wrapper programs 90 are able to import, export, extract and find (or call upon) specific data types. As discussed further below, the wrappers 90 are able to analyze the templates 70 and identify control variables that can be replaced during the instantiation process or that may be linked with other variables by way of interface mappings 68 in the formation of compound templates 74. Additionally, the wrapper programs 90 are able to analyze the templates 70 or objects 91 to determine the type of software program or program format that was used to create that data. For example, in certain embodiments, MS Word and MS Excel wrapper programs 90 would respectively be able to determine whether data in a template 70 is within (or not within) a MS Word format or a MS Excel format. In some of these embodiments, application programs (e.g., MS Word or MS Excel) can assist in selecting which of the wrapper programs should be invoked in a given circumstance. In other embodiments, a given wrapper program 90 would be able to determine the format of data in a template 70 from among several formats. For example, in one such embodiment, a given wrapper program 90 would be able to determine whether data in a template 70 is within a MS Word format, a MS Excel format, or another format. The wrapper programs 90 are further capable of determining which editing tools or other applications are appropriate for allowing a user to input or otherwise modify data at one of the operator interfaces 25. Thus, due to the wrapper programs 90, the system 10 enables the development of control programs by way of a variety of software programs and other tools.

Turning to FIGS. 4–6, exemplary screens 200, 300 and 400 capable of being displayed at one or more of the operator interfaces 25 during the development of a control program 34 are shown. The screens 200, 300 and 400 include a variety of user-selectable buttons 202, which provide various options to a user. The buttons 202, and other selectable options discussed below, can be selected through the use of a conventional input/output device at the operator interfaces 25, such as a mouse, and the buttons 202 in one embodiment are drop-down menus containing additional options.

During operation of the system 10, a variety of information from the repository 50 can be provided to the operator interfaces 25 and displayed on those interfaces. In particular, the screens 200, 300 and 400 can display several different windows or panes. In one embodiment, these panes can include a system equipment hierarchy pane 204, which displays the physical layout of equipment components in a project as well as the objects that have been instantiated in correspondence with those components. Also, the panes can include a template libraries pane 206, which is able to display the templates within a selected template library. The template libraries pane 206 includes a drop down menu 208 by which a user is able to select a particular library of templates from a list of existing templates.

As shown in FIGS. 4–6, the system equipment hierarchy pane 204 in certain embodiments provides a map or chart of the various equipment components and/or corresponding objects in a given project 80. For example, a project entitled "Kam & Joe's plant" includes two assembly lines A-1 and A-2, with the first assembly line A-1 including a higher-level component conveyor 1 that includes two lower-level components motor 1 and motor 2, while the second assembly line A-2 includes three components start, stop and motor 1. Also with respect to FIGS. 4–6, an exemplary template libraries pane 206 shows an exemplary library "testlib" that includes compound templates and simple templates, with the simple templates including templates created using MS Word, RS Logix 5000, and RSView. As shown, the panes 204, 206 can display their information in the form of a set of folders, although in alternate embodiments the information can be cataloged in other formats.

In addition to the system equipment hierarchy pane 204 and template libraries pane 206, depending upon the embodiment, the system 10 is capable of displaying several other panes (not shown). These can include, for example, a control hardware hierarchy pane, which displays the physical layout of control hardware devices (such as programmable controllers, chassis, and I/O modules) and which contains all the device service-related objects in a tree structure. Also, a system 10 can display a control hardware catalog pane, which displays a catalog of all supported control hardware devices, a workflow pane, which displays all supported workflows, and a detail pane, which displays the properties of a selected object in the system equipment hierarchy pane 204, template libraries pane 206, control hardware hierarchy pane or other control hardware catalog pane in a table format. Further, the system 10 can include a field device library pane, which displays a list of field device classes, and a field device picker pane, which displays all instantiated field devices in a project, optionally filtered by whether those devices are attached to I/O terminals.

Further, as shown in FIGS. 4–6, a workspace pane 210 is provided, which is the main editing area for templates, objects and projects. As shown in FIG. 4, the workspace pane 210 can include, upon the selection of a template "RUN" from the template libraries pane 206, a pane 212 that displays characteristics of the template "RUN". The pane 212 includes multiple variables, properties associated with those variables, values of those variables, and customized aspects. The pane 212 also includes selectable buttons 214 that allow a user to select a general display of template characteristics 214, aspects of a particular component within the templates 216, and properties 218. Also, the pane 212 includes buttons 220 that allow the user to add a component, delete a component or replace a component within the template, and additional buttons 222 for applying, canceling, or accepting changes to a template 222, so that the template stored in the repository 50 is updated.

FIGS. 4–6 show different views of the workspace pane 210 during the development of a compound template "conveyor" and then the instantiation of that compound template as a compound object "conveyor 1". As shown in FIG. 4, upon selection of the simple templates "RUN", "motor up", and "motor down" from the template libraries pane 206, the ladder logic corresponding to each of these simple templates appears in the workspace pane 210. Specifically, the ladder logic is displayed using RS Logix 5000 software, which is invoked by a wrapper program 90. Further as shown, the ladder logic corresponding to the "RUN" template provides that a conveyor motor will start to run whenever a RUN pushbutton is pressed, the conveyor table is at its upper limit, and the conveyor table is not at its lower limit. Thus, the output of this rung of ladder logic depends upon three variables, namely, "RUN_PB", which represents the status of the RUN pushbutton, "UP", which represents whether the conveyor table is at its uppermost position, and "DOWN", which represents whether the conveyor table is at its lowermost position.

The ladder logic corresponding to the "motor up" template is designed so that a motor continues to receive an up signal so long as an up pushbutton is pressed (represented by a variable "UP_PB"), and the conveyor table is not yet at its upper limit (as represented by another variable "UP_LIMIT"). Additionally, the "motor down" template ladder logic provides a signal to cause downward movement based upon whether a down pushbutton is pressed (as represented by a variable "DOWN_PB") and further dependent upon whether the conveyor table has reached its lowest position (as indicated by a variable "DOWN_LIMIT").

The desired compound template to be created ("conveyor") is for a conveyor that is able to be lowered or raised within upper and lower limits and, only when at its upper limit, is able to be run. As such, the conveyor template can be formed from the "RUN", "motor up", and "motor down" simple templates. However, in order that the control variables of the compound template be properly modified during the instantiation process, certain of the control variables of the simple templates must be modified. In particular, the "UP_LIMIT" variable of the "motor up" simple template should be the same as the "UP" variable of the "RUN" simple template, and the "DOWN_LIMIT" control variable of the "motor down" simple template should be the same as the "DOWN" variable of the "RUN" simple template.

In accordance with one embodiment of the present invention, one or more of the wrappers 90 are capable of analyzing the simple templates "RUN", "motor up", and "motor down" to identify control variables that are potentially replaceable. Upon receiving a command from the operator to form the compound template "conveyor" (e.g., by choosing a corresponding selection listed under the "template" button 202), the workspace 210 displays a pane 213 to which the user can add the simple templates that are to be included within the compound template. Specifically, the pane 213 lists each of the selected simple templates in a "name" column and then in adjacent columns provides template type information and version information. The user is then prompted to enter interface tags that correspond to the identified control variables.

Upon the entry of such interface tags, another table 230 within the workspace pane 210 displays the correspondences between the interface tags and the various control variables of the simple templates. Thus, a first interface tag "RAISED" corresponds to both the "UP_LIMIT" control variable of the "motor up" simple template and the "UP" control variable of the "RUN" simple template, and a second interface tag "LOWERED" corresponds to the "DOWN_LIMIT" control variable of the "motor down" simple template and the "DOWN" variable of the "RUN" simple template. Referring again to FIG. 5, the pane 224 is modified to include the interface tags "RAISED" and "LOWERED" in place of the "UP_LIMIT", "DOWN_LIMIT", "UP" and "DOWN" control variables of the simple templates.

Once the compound template "conveyor" has been completed, it can be instantiated in the same manner as a simple template. Thus, upon receiving a command to instantiate the compound object "conveyor 1", the system 10 inserts appropriate prefixes (or suffixes) into the control variable names. Thus, as shown in a compound object pane 232 of FIG. 6, the control variable that was originally the "UP" variable of the simple template "RUN" (see FIG. 4) now is the variable "CONVEYOR1_RAISED." The term "RAISED" is the interface tag that was substituted for "UP", and additionally the prefix "CONVEYOR1" has been added during instantiation of the compound template "conveyor1."

Further, as shown in pane 224 of FIG. 6, the instantiated compound object "conveyor 1" includes three rungs of ladder logic. The first rung of ladder logic, which governs the movement of the conveyor due to the second motor 17, includes control variables "CONVEYOR1_RUN_PB", "CONVEYOR1_RAISED", and "CONVEYOR1_LOWERED", in addition to an output variable "CONVEYOR$_1$_RUN." The compound object further includes second and third ladder logic rungs that employ the variables "CONVEYOR1_UP_PB", "CONVEYOR1_RAISED", "CONVEYOR1_UP", "CONVEYOR1_DOWN_PB", "CONVEYOR1_LOWERED" AND "CONVEYOR1_DOWN.".

Figure 7:
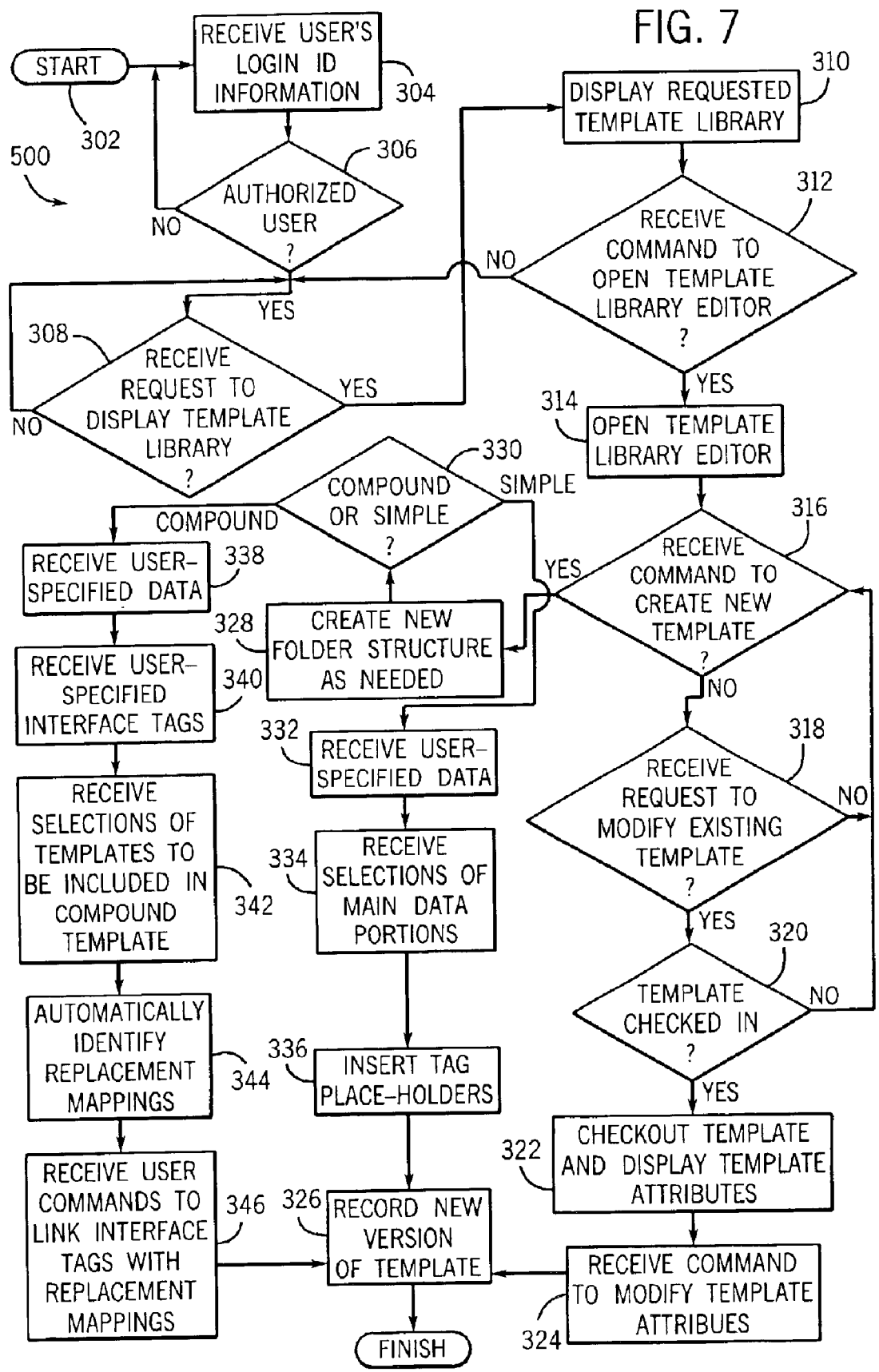
FIG. 7 is a flow chart showing exemplary steps of operation of the system of FIG. 1 during development of a control program.

Referring to FIG. 7, exemplary steps of operation of the system 10 are shown by a flowchart 500. These steps are meant to be exemplary, that is, the exact steps of operation of the system 10 can vary from those shown in terms of the order of the steps, as well as in terms of the number of steps and whether any given set of steps are performed at any given time. Upon starting operation at step 302, the system receives by way of the operator interface 25 identification information from a user (e.g., a program designer) who desires to login to the system at step 304. At step 306, the system 10 determines whether the identification information sufficiently indicates that the user is authorized to log on to the system. If the user is not authorized, the system returns to step 304, while if the user is authorized, the step proceeds to step 308. At step 308, the system 10 awaits a request or command from the user, which often will be a request to display a particular template library. If such a request is provided, the system proceeds to step 310, at which the system displays the requested template library (e.g., by way of the template libraries pane 206). If such a request is not received at step 308, the system remains at step 308.

Proceeding from step 310, the system 10 at step 312 then may receive a command to open the template library editor, since often a user will wish to edit one or more of the templates within the library. If such a command is not received, the system returns to step 308. However, assuming that such a command is received at step 312, the system proceeds to step 314, at which the template library editor is opened. Then, at step 316, the system may receive a command to create a new template. If no such request is received, the system instead may receive a request to modify one of the existing templates shown in the library of templates currently being displayed, at step 318. If no such command is received, the system returns to step 316, while if such a request to modify an existing template is received at step 318, the system then proceeds to step 320, at which the system determines whether the template is checked into the system. Thus, the repository 50 makes sure that no other user is currently modifying the existing template before it allows the present user to modify that template. However, if one user is modifying a template, the repository 50 still allows other users to access the template simply to read the template information without modifying it. If the template is determined to be checked out at step 320, the system returns to step 316, while if the template is determined to be checked in, the system allows the requested template to be checked out and displays the template's attributes at step 322. Then at step 324, the system may receive a command to modify certain of the template's attributes, such as its data portions 76, its replacement mappings 78, or other user-defined property 79. If such changes are entered, the system proceeds to step 326, at which it records a new version of the template in the repository, and checks in that template (as well as stores a version number associated with that template). Once the modified version of the template has been checked in, it can be modified by another user (one user at a time), and also can be simultaneously accessed by other users to the extent that those users only wish to access the template to read the template's information.

If, at step 316, the system 10 has been commanded to create a new template (e.g., a create new template button has been selected by the user), the system then may create a new folder structure or structures within the template library to account for the new template, at step 328. Further, it is determined at step 330 whether the requested new template will be a simple template 72 or a compound template 74. If a new simple template has been requested, the system proceeds to step 332, at which the system may receive user-specified data, such as a name of the new simple template. Then, at step 334, the system may receive additional information such as information concerning the main data portions 76 or the replacement mappings 78 associated with the new simple template 72. Then, at step 336, the system will automatically insert tag placeholders within the control variable names associated with the new simple template. In one example, the placeholder may take the form of a word surrounded by percent signs (e.g., % object 1%). Regardless of the placeholder, the placeholder is incorporated into the control variables in order that later on, during instantiation of the template, the appropriate changes to the control variable can be automatically made by the system 10 (e.g., the appropriate addition of prefixes or suffixes to the control variable names). Once the tag placeholders have been inserted at step 336, the new simple template is recorded in the repository 50 (as is its version, e.g., version 1) at step 326.

If at step 330, a compound template was selected, the system 10 at step 338 may receive user-specified data such as names and other characteristics of the compound template 74 including, in particular, names of the simple templates or other compound templates that are intended to be incorporated within that compound template. Then, at step 340, the system receives user-specified interface tags, which will be used to link up the component templates within the compound template. Then at step 342, the system receives selections by the user of the actual simple templates or compound templates that are to be included in the compound template. Next, at step 344, the system automatically identifies the replacement mappings in each of the selected templates. These are the control variables (as modified by the insertion of placeholders) that can be linked up to form the compound template. This is typically performed by one of the wrapper programs 90. Then, at step 346, the system receives user commands to link the various interface tags with the different replacement mappings, which completes the formation of the compound template. Thus, after step 346 the system again proceeds to step 326, at which the new compound template is saved in the repository 50.

Although not shown in FIG. 7, additional operations (some of which are described above with reference to FIGS. 3–6) can be requested by users and/or performed by the system 10 in addition to the operations shown in FIG. 7. In particular, the system may receive requests from users to display projects and the objects associated with those projects (as well as equipment components associated with those projects) and the system may respond by displaying that information in a manner similar to steps 308 and 310 of FIG. 7. Likewise, the system can receive requests from users to modify various objects and create new objects. In particular, the system can perform operations associated with the instantiation of templates into objects with respect to different control programs being developed. Also, once a control program for a project has been developed, it can be downloaded to the internal processor 26 of the programmable logic controller 22 that requires the program in order to control the industrial process 12 with which the controller associated. While the repository 50 limits the access of given templates, objects and projects to one user at a time, the system 10 is configured to allow separate copies of any given control program to be downloaded to programmable logic controllers even though the repository 50 continues to maintain a copy of that control program. Thus, a programmable logic controller 22 can continue to use a given control program even though that control program may be further modified later on by other parties for other purposes.

Figure 8:
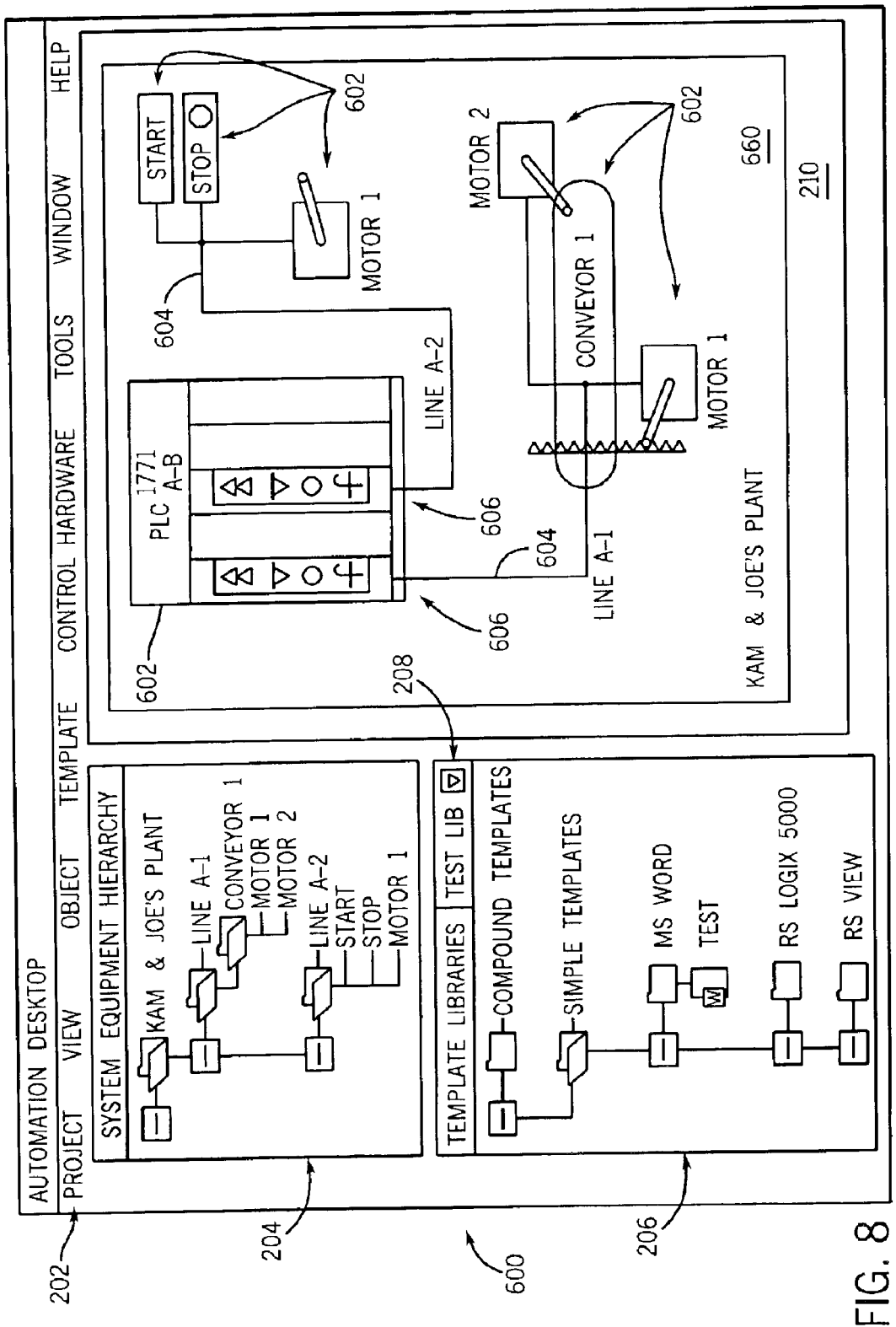
FIG. 8 provides a view of an additional exemplary screen that may be displayed by the operator interfaces of the system of FIG. 1.

Turning to FIG. 8, another exemplary screen 600 includes, in addition to the user-selectable buttons 202, the system equipment hierarchy pane 204 and the template libraries pane 206, an advanced control hardware hierarchy pane 660 within the workspace pane 210. The advanced control hardware hierarchy pane 660 shows, in schematic form, the various components of the plant (in this case, Kam & Joe's plant). Each of the major system components are shown as a separate respective graphical icon 602. Thus, in this case, icons 602 are displayed for the components of "line A-1", namely, "conveyor 1", "motor 1", "motor2", and for the components of "line A-2", namely, "start", "stop" and "motor 1". Also, one of the icons 602 represents, in this example, the programmable logic controller used to control the plant. As shown, some of the icons 602 can be varied in appearance depending upon particular characteristics of the components being represented. For example, the icon corresponding to the programmable logic controller includes slots/ports 606, two of which are shown to include cards that are used to control the first and second lines A-1 and A-2. As shown, electrical or other connections between components can be shown schematically through the addition of connection links 604.

By allowing the components of a given plant or other system to be displayed graphically on operator interfaces, the advanced control hardware hierarchy pane 660 allows users to navigate through around the system and easily identify and select components that are of interest. For example, a user can use a mouse (or similar I/O device) to move a cursor around the advanced control hardware hierarchy pane 660 to move to different components or groups of components. Also, where all of the components of a large system cannot be displayed on a single display screen, the system also allows for a user to shift the region of focus so that different portions of the overall schematic become viewable (or, in alternate embodiments, different pages of a schematic can be selected for viewing). The advanced control hardware hierarchy pane 660 also aids the user in creating a control program for a system, since the relative connection points between different components are easily visualized.

Further, in at least some embodiments, the icons 602 are tied to templates, objects or other files/programs that are to be implemented with respect to the components represented by those icons. By selecting (e.g., "clicking") on a given icon 602, an appropriate wrapper program 90 is invoked that allows for the appropriate application to be started so that the file/program associated with the icon is activated, and so that data associated with the icon is viewable by the user. Thus, the advanced control hardware hierarchy pane 660 provides a convenient mechanism by which users can find and obtain information relating to components of interest. In certain embodiments, after template information has been associated with the icons 602, the objects associated with different system components can be instantiated merely by further selecting (e.g., "double-clicking") on the respective icons 602. In other embodiments, an entire control program for the system is automatically instantiated as templates are associated with the displayed icons 602 (e.g., by dragging the relevant templates on the icons). The system displayed on the advanced control hardware hierarchy pane 660 can created by one or more users, and existing system schematics can be stored in, and accessed from, the repository 50. As with other information stored in the repository 50, only one user can be modifying the schematic information at any one time.

Figure 9:
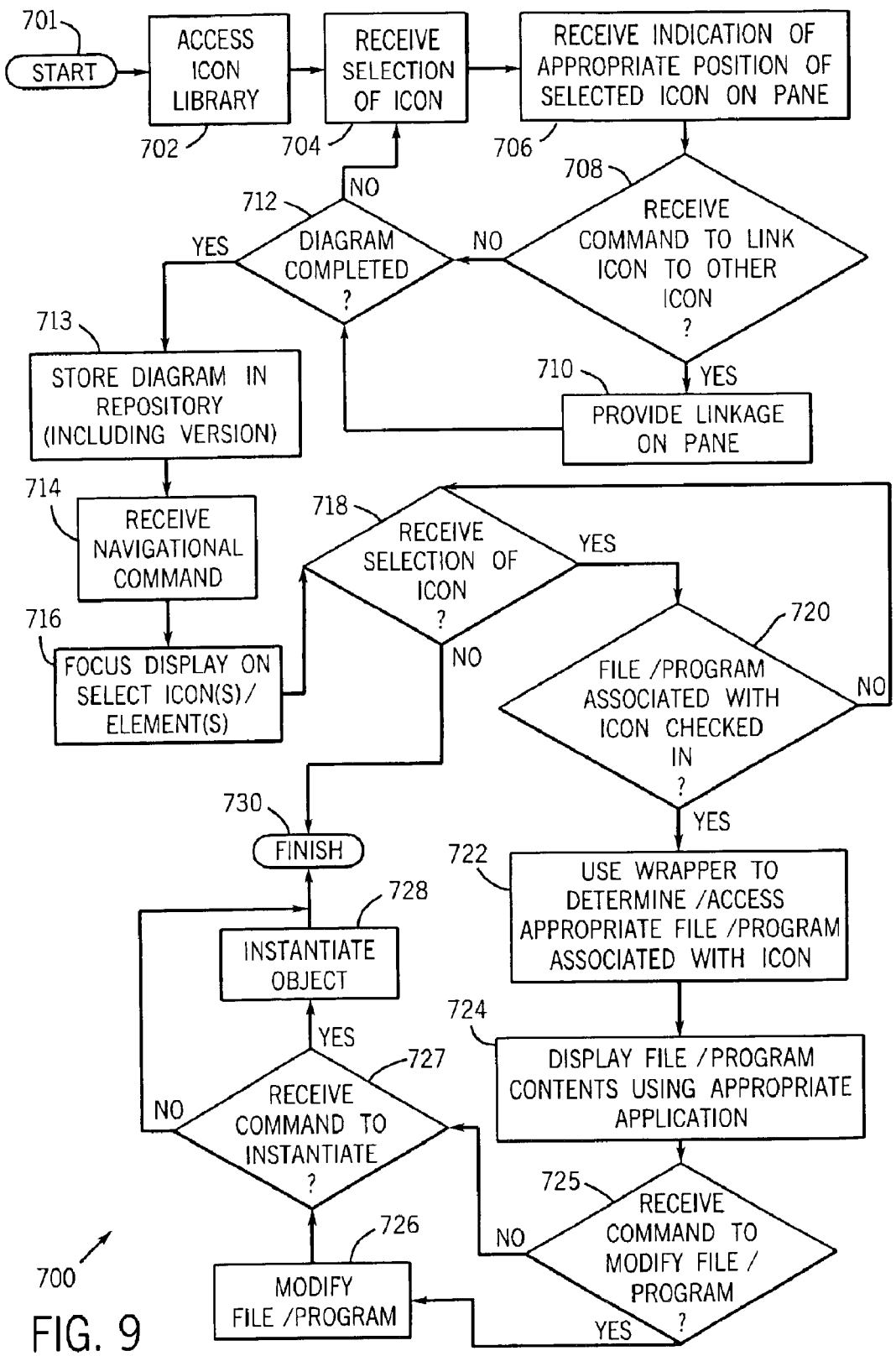
FIG. 9 is a flow chart showing exemplary steps of operation of the system of FIG. 1, particular in connection with an advanced control hardware hierarchy pane as shown in FIG. 8.

Referring further to FIG. 9, a flow chart 700 shows exemplary steps of operation in designing and modifying a schematic representation of a system by way of the advanced control hardware hierarchy pane 660 and utilizing that schematic to develop a control program. Upon starting at step 701, a user may access an icon library 702 to obtain icons 602 associated with different system components. Some of the icons 602 may relate to groups of components. The icons 602 may be obtainable in one of the libraries accessible using the template libraries pane 206 and often (although not always) may have templates, files, programs or other data associated with them. Upon receiving a selection by a user of an icon at step 704, the system also typically will receive an indication of an appropriate position of the selected icon on the advanced control hardware hierarchy pane 660. For example, the user may drag the icon to a particular location on the pane 660. Then, at step 708, the system may receive a command to link the dropped icon to one or more other icons. If such a command is provided, the system displays a connection link 604 (e.g., a line) on the screen connecting the appropriate icons. If no linking command was received at step 708, it is determined whether the schematic diagram has been completed, at step 712. If the diagram has not yet been completed, the system can receive additional selections of icons to add to the diagram, by returning to step 704. If the diagram has been completed, it can be stored in the repository 50 at step 713 (the stored information may further include version information).

At step 714, the user may provide to the system a navigational command. This could be, for example (in the case of a large schematic diagram that is not easily displayed on a single screen), a command to shift the portion of the schematic diagram that is being displayed. Such a command could be provided, for example, by "dragging" the entire schematic diagram. In response to such a command, a particular portion of the schematic diagram is displayed, at step 716. Next, at step 718, the system may receive a selection of one of the icons 602. The selection may be provided by a user who desires that detailed information about the system component represented by the icon be displayed. Also, a user may provide such a selection to cause the system to display a template, object, program, or other type of data that is associated with the icon, so that the data can be modified. If such is the case, at step 720, the system determines whether the selected information has been checked in to the repository 50. If the data has not been checked in, the system returns to step 718 (and/or provides an indication to the user that the data cannot be modified, although the user may still be able to read the data).

If the selected data has been checked in, the system at step 722 employs one (or more) of the wrapper programs 90 to identify the appropriate application program that can be used to access and modify the data. Then, at step 724, the accessed data is displayed. Further, the accessed data can then be modified and further stored in response to a command to modify the data, at step 725. If such a command is received, the data is modified at step 726 (and may also be stored in the repository 50 at the point). If the data associated with the icon 602 is in the form of a template, the user can at this point provide a command to instantiate an object based upon this data, at step 727. If no such command is received, the system is finished (at step 730) or (depending upon the embodiment) may return to previous steps (e.g., step 718) to receive additional commands from the user concerning the same or other icons 602. If an instantiation command is received, then the object is instantiated, and the system may at this point be finished (at step 730) or return to receive additional commands from the user. The steps shown in FIG. 9 are meant to be exemplary. Consequently, different steps than those shown can be taken in conjunction with the development of control programs using the advanced control hardware hierarchy pane 660.

It is specifically intended that the present invention not be limited to the embodiments and illustrations contained herein, but that modified forms of those embodiments including portions of the embodiments and combinations of elements of different embodiments also be included as come within the scope of the following claims. The present system and method can be implemented to design programs that are for a variety of purposes, beyond the control of strictly industrial processes. For example, the present system and method can be implemented in designing programs that integrate information related to industrial processes with the calculation of financial results and predictions. The present system and method can be implemented in designing programs that relate to higher-level business processes such as manufacturing execution systems (MES) and high-level ERP systems. Indeed, the present system and method can be implemented in designing programs for purposes unrelated to industrial control, for example, programs used by personal computers used to control functionality within a home. The present invention is intended to broadly extend to the development of customized programs through the use of a variety of hardware, software applications, control and processing devices, operator interfaces and networking structures such as the internet.

We claim:

1. A system for developing a program for operating at least one industrial process, the system comprising:
   a first operator interface; and
   a computer coupled to the operator interface, the computer including
      a memory and
      a processor;

wherein the memory stores a first program and information concerning a plurality of templates within at least one library and a plurality of objects within at least one project that is representative of the at least one industrial process;

wherein the processor is configured to execute the first program to process information stored within the memory so that the processed, stored information can be operated upon by a second program; and wherein the first program is capable of performing at least one of (1) determining an identity of one of the second program and a third program that was employed to generate the information, and (2) selecting portions of the stored information for use by the second program.

2. The system of claim 1, wherein the portions of the stored information that are selectable by the first program include replacement fields within the templates.

3. The system of claim 1, wherein the processor is further configured to execute the first program to configure data for storage within the memory as at least one of a template and an object.

4. The system of claim 1, wherein the first program is capable of identifying a version of the third program that was employed to generate the information.

5. The system of claim 4, wherein the third program related to one of control logic, graphical information, text, spreadsheet data.

6. The system of claim 1, further comprising a second operator interface, wherein the first and second operator interfaces are in communication with the computer by way of at least one communication link.

7. The system of claim 6, wherein the memory and processor operate in conjunction with one another as a repository, wherein the repository records that the information concerning the templates and objects is checked out when the information is being accessed at one of the first and second operator interfaces, so that the information cannot be modified simultaneously at both of the first and second operator interfaces.

8. The system of claim 7, wherein the repository records a respective version corresponding to each of the stored templates and objects.

9. The system of claim 7, wherein the computer requires that identification be provided by way of one of the operator interfaces before the stored information can be accessed.

10. The system of claim 7 wherein, when the templates of a library are accessed by way of one of the operator interfaces, the templates of the library are displayed in a catalog format on a template libraries pane on the operator interface, and when the objects of a project are accessed by way of one of the operator interfaces, the objects of the project are displayed in a system layout format on a system equipment hierarchy pane on the operator interface.

11. The system of claim 7, wherein the repository records whether a given application program being used by one of the operator interfaces has been appropriately licensed.

12. The system of claim 1, wherein the first program is a wrapper program stored in the memory of the computer, and the second and third programs are application programs stored in a memory of the first operator interface, which is a client computer.

13. The system of claim 12, wherein additional wrapper programs can be stored in the memory of the computer to correspond to newly-entered templates.

14. The system of claim 1, wherein the templates are stored within a plurality of libraries, wherein the templates within each of the plurality of libraries are stored in a nested format, and wherein the operator interface allows a user to navigate through the plurality of libraries and templates.

15. The system of claim 14 wherein, upon the selecting of one of the templates by way of the first operator interface, contents of that template are displayed in an editor window on the first operator interface.

16. The system of claim 15, wherein upon the displaying of the contents in the editor window, the first operator interface is capable of receiving inputs regarding properties of the template including template name and description.

17. A system for developing a program for operating at least one industrial process, the system comprising:

a plurality of operator interfaces;

means for storing information, wherein the stored information includes templates in at least one library, and projects having a plurality of objects, wherein the projects correspond to the at least one industrial process;

means for governing access to the stored information so that each respective library and object is only accessible by way of a single operator interface at any given time; and means for processing the stored information when it is being accessed so that at least one of (1) the stored information is in a format that can be acted upon by an application program, and (2) modifiable portions of the stored information are identified.

18. A method of developing a program for operating at least one industrial process, the method comprising:

receiving a first command from an operator interface to access a desired library of templates;

retrieving from a repository stored information regarding the desired library;

processing the stored information by way of a wrapper program in order to at least one of (1) obtain a desired subset of the stored information, (2) identify an application program that is capable of processing the stored information, and (3) reconfiguring at least a portion of the stored information so that it is capable of being processed by the application program;

displaying at least one portion of the processed, stored information at the operator interface;

receiving a second command from the operator interface to access a desired project;

retrieving from the repository store information regarding the desired project; and receiving a third command from the operator interface to instantiate one of the desired template and another template based upon the desired template onto an object within the desired project.

19. The method of claim 18, wherein the displaying of the at least one portion of the processed, stored information at the operator interface occurs through the use of the application program.

20. The method of claim 18, further comprising, prior to the retrieving and processing of the stored information, verifying that the stored information is not currently checked out and, if the stored information is not currently checked out, recording that the stored information is checked out when the stored information is retrieved so that the stored information cannot be simultaneously accessed by way of another operator interface.

21. A method for developing and retaining a program for controlling an industrial process, the method comprising:

providing a database for storing data files;

providing a graphical user interface capable of displaying graphical objects;

displaying on the graphical user interface a plurality of the graphical objects in association with one another to represent the industrial process;

receiving a selection of one of the graphical objects;

determining whether data stored in a repository and associated with the selected graphical object is currently checked out by another;

displaying the data associated with the selected graphical object when the data is determined to be not checked out by another.

22. The method of claim 21, wherein the data associated with the selected graphical object is program code, wherein each of the plurality of graphical objects has respective data associated with it, and wherein the graphical objects are arranged to resemble the industrial process and the data associated with the respective graphical objects is instantiated to form a control program capable of controlling the industrial process.

23. The method of claim 22, wherein a wrapper program is employed to determine an application that can be used to access and display the data associated with the graphical object and wherein, when the data is accessed, the data can be modified in response to user commands and then stored within the repository.

24. The method of claim 23, further including receiving a command from a user to shift a displayed subset of the graphical objects, so that a user can navigate through various components of the industrial process and program fragments associated therewith.

25. A system for developing a program for operating at least one industrial process, the system comprising:

a first operator interface; and a computer coupled to the operator interface, the computer including
a memory and
a processor;

wherein the first operator interface is capable of displaying a plurality of graphical objects in associated with one another, wherein the associated graphical objects are representative of components of the industrial process;

wherein the first operator interface is capable of receiving commands to display data associated with the respective graphical objects; and wherein, in response to one of the commands being provided to the first operator interface with respect to one of the graphical objects, a wrapper is actuated within the computer to determine an application that can be employed to access the data associated with that graphical object, so that the data can then be displayed at the operator interface by way of the application.

26. The apparatus of claim 25, wherein the data includes a template, the data is stored within a repository within the memory, and wherein the data can be modified by way of the first operator interface so long as the data is not currently being modified by way of a second operator interface.

* * * * *